Figure 1:
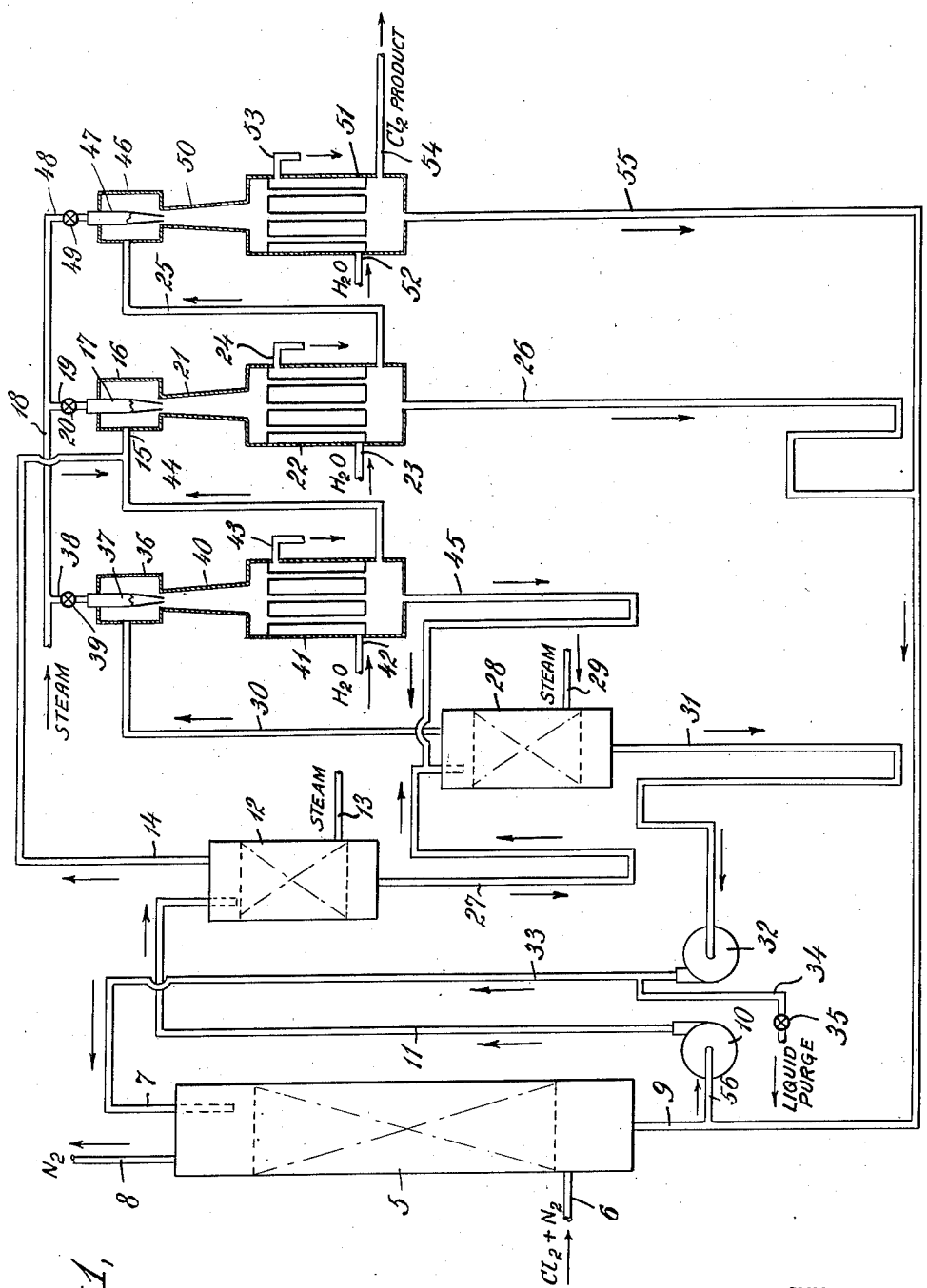

Aug. 24, 1948.　　　F. R. BALCAR　　　2,447,834
CONCENTRATION OF CHLORINE
Filed April 15, 1944　　　　　　　　　　2 Sheets-Sheet 1

INVENTOR.
Frederick R. Balcar
BY
Pennie Davis Marvin & Edmonds
ATTORNEYS

Aug. 24, 1948.　　　F. R. BALCAR　　　2,447,834
CONCENTRATION OF CHLORINE
Filed April 15, 1944　　　2 Sheets-Sheet 2
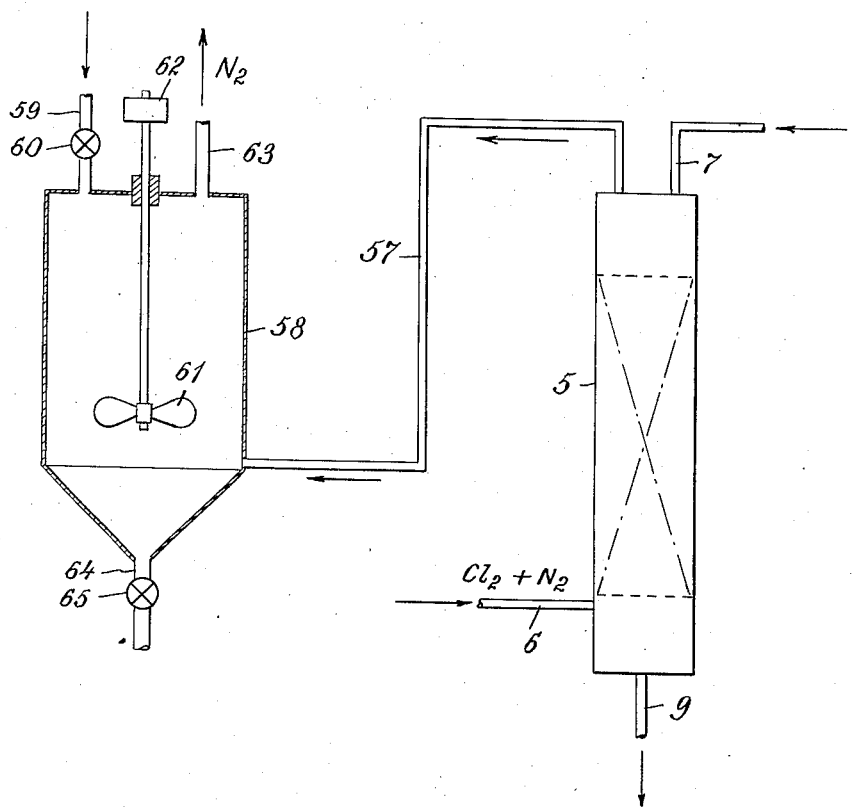
INVENTOR.
Frederick R. Balcar
BY
ATTORNEYS Patented Aug. 24, 1948

2,447,834

UNITED STATES PATENT OFFICE 2,447,834

CONCENTRATION OF CHLORINE

Frederick R. Balcar, Stamford, Conn., assignor to Air Reduction Company, Incorporated, New York, N. Y., a corporation of New York Application April 15, 1944, Serial No. 531,267

8 Claims. (Cl. 23—219)

This invention relates to the concentration of dilute chlorine and particularly to the recovery of chlorine produced by catalytic oxidation of hydrogen chloride.

The production of chlorine by the oxidation of hydrogen chloride in the presence of a catalyst is well known. Pure oxygen may be used in the oxidation and affords a product free from other gases which can be recovered readily. Oxygen is, however, relatively expensive. The oxygen of the atmosphere is substantially equivalent as an oxidizing agent, but the product is necessarily contaminated with a large proportion of nitrogen from which the chlorine must be separated.

Various conventional procedures are available for that purpose, but they involve great expense for initial cost and upkeep of the necessary apparatus. Moist chlorine, even at ordinary room temperature, attacks common metals rapidly, causing accelerated deterioration. Hence the use of pumps, compressors, blowers and all apparatus which cannot be constructed of corrosion-proof materials or easily protected from the corrosive effect of chlorine must be avoided.

Water is known to be a very poor solvent for chlorine. When saturated with chlorine gas in about 20% concentration, it will contain only about 0.1% by weight of chlorine. This amount is so small as to make the use of water as a solvent in chlorine recovery operations appear to be hopeless. The expelling of chlorine in commercial quantities from the large volume of water required to absorb it would be practically impossible according to conventional procedure. It would be necessary to provide relatively enormous heat exchange surfaces resistant to the action of chlorine, and the amount of steam required would be greater in cost than the value of the chlorine recovered. However, as will hereinafter appear, water can be used successfully to recover chlorine from gaseous mixtures of relatively low concentration.

It is the object of the present invention to provide a relatively simple, economical and effective method of separating chlorine from gases such as nitrogen, with which it is mixed.

Another object of the invention is the provision of a method whereby water may be used effectively and economically in the separation of chlorine from gases such as nitrogen.

A further object of the invention is the provision of a method of separating chlorine from nitrogen and the like wherein apparatus with a minimum of moving parts and readily protectable from corrosion can be utilized.

Other objects and advantages of the invention will be apparent as it is better understood by reference to the following specification and the accompanying drawing, in which Fig. 1 is a diagrammatic illustration of apparatus suitable for the practice of the invention; and Fig. 2 is a similar view illustrating auxiliary equipment which can be employed to recover any residue of chlorine which escapes from the primary apparatus.

In carrying out the invention, the dilute chlorine is first absorbed in a relatively large volume of water. The nitrogen is thus separated and may be delivered to the atmosphere. Since it may be uneconomical to operate the apparatus so that much more than 90% of the chlorine present is absorbed in the water, it is preferable to employ auxiliary equipment as hereinafter described in which the residual chlorine may be absorbed in milk of lime or equivalent material which will fix the chlorine and prevent escape of the residue to the atmosphere.

The water solution of chlorine is subjected to reduced pressure in successive steps to liberate the chlorine therefrom. To maintain the reduced pressure, any suitable equipment may be employed, but I prefer to utilize steam jet evactors with accompanying condensers which permit delivery of the chlorine product at atmospheric pressure and a condensate consisting of water which may contain small percentages of chlorine. The condensed water is cycled in the system so that none of the chlorine is lost. A purge is provided to draw off an amount of water equivalent to the amount of steam employed in the system.

The evactors may be constructed of any suitable corrosion resistant material such as porcelain, carbon or other acid-proof materials. Since these devices embody no moving parts, they can be constructed cheaply and operated with a minimum of maintenance cost. Other parts of the apparatus which are likely to be affected by moist chlorine can be suitably protected in the conventional manner to avoid damage thereto.

Referring to the drawing, 5 indicates a tower which may be packed with rings or other devices to facilitate increased surface contact between the liquid and gases flowing therethrough. The dilute chlorine mixed with nitrogen is introduced through a pipe 6 at the bottom of the tower and flows upwardly therethrough in contact with water introduced through the pipe 7. The nitrogen which is not absorbed escapes through the pipe 8. The water containing the dissolved chlorine is withdrawn at the bottom through a pipe 9 and delivered by a pump 10 and pipe 11 to a tower 12 which is also packed with rings or other devices to facilitate exposure of the liquid in relatively thin films. If desired, steam may be introduced through a pipe 13 to maintain constant temperature of the liquid in the tower 12. Only a relatively small amount of steam is required for that purpose, and it may be unnecessary to employ it.

The liquid in its descent through the tower 12 is subjected to reduced pressure. The pressure employed may be such that the partial pressure of the chlorine in the vapors in equilibrium with the liquid leaving the tower is approximately one-half that of the partial pressure of chlorine in the vapor in equilibrium with the liquid entering the tower. Under these conditions, about half of the chlorine entering the tower 12 is removed as vapor and passes through the outlet pipe 14 to the inlet 15 of the evactor 16. The latter comprises an injector 17 supplied with steam from a pipe 18 through a branch 19 controlled by a valve 20 and a Venturi tube 21 which is connected to a condenser 22. Water is supplied to the condenser through a pipe 23 and withdrawn through a pipe 24. The amount of steam supplied to the evactor will be sufficient to maintain the desired reduced pressure in the tower 12. The steam is condensed in the condenser 22 and the chlorine escapes through a pipe 25. The condensate is withdrawn through a pipe 26.

The liquid from which approximately half the chlorine has been removed in the tower 12 is delivered by a pipe 27 to a second tower 28 which is packed with rings or other devices as in the case of the tower 12. Steam is introduced to the bottom of the tower 28 through a pipe 29 in amount sufficient to raise the temperature of the exit solution to a point where the vapor pressure of the water is equal to the combined partial pressures of chlorine and water in the vapor in equilibrium with the inlet solution to the tower. This temperature rise is of the order of but a few degrees. A reduced pressure is maintained within the tower 28, such pressure being at or slightly above the vapor pressure of the solvent at the temperature involved. As a result, substantially all of the chlorine is removed from the liquid and escapes through a pipe 30. The residual liquid which in some instances, at least, will include some chlorine dissolved in water, is withdrawn through a pipe 31 and is delivered by a pump 32 and pipe 33 to the inlet pipe 7 of the tower 5. A purge 34 controlled by a valve 35 permits the withdrawal of surplus liquid.

The necessary reduced pressure in the tower 28 is maintained by an evactor 36 consisting of an injector 37 connected to the steam line 18 by a pipe 38 controlled by a valve 39 and a Venturi tube 40 which is connected to a condenser 41. Water is supplied to the condenser through a pipe 42 and withdrawn through a pipe 43. The chlorine is delivered by a pipe 44 to the inlet pipe 15 of the evactor 16. The condensate is delivered through a pipe 45 to the pipe 27 and thus returned to the tower 28.

The chlorine delivered by the pipe 25 which includes all of the chlorine separated from the liquid in the towers 12 and 28, enters an evactor 46 consisting of an injector 47 connected to the steam line 18 by a pipe 48 controlled by a valve 49 and a Venturi tube 50 which is connected to a condenser 51. Water is supplied to the condenser through a pipe 52 and withdrawn through a pipe 53. The amount of steam supplied is sufficient to bring the chlorine up to atmospheric pressure, and it is discharged through a pipe 54 and may be delivered to any suitable receptacle for storage. The condensate is delivered through a pipe 55 and is joined by the condensate from the pipe 26. The combined condensates are delivered by a pipe 56 to the inlet of the pump 10 and thus combined with the liquid from the tower 5. This arrangement ensures against any substantial loss of chlorine in the operation.

As an example of the application of the invention, I shall describe the recovery and concentration of about one ton of chlorine per hour in accordance with the procedure. Gas containing approximately 20% by volume of chlorine is fed to the bottom of the tower 5. About 200,000 gallons of water per hour are passed through the tower 5 at a temperature of about 85° F. The resulting dilute chlorine solution is pumped to the tower 12, where it is subjected to a reduced pressure of about 105 mm. of mercury absolute with or without the addition of steam. As the partial pressure of the chlorine in the original gas mixture entering the tower 5 will be about 152 mm. of mercury, the subjection in the tower 12 of the dilute chlorine solution from the tower 5 to a lower pressure of about 105 mm. of mercury will insure vaporization of chlorine which is removed through the pipe 14. The vapors removed through the pipe 14 will contain about 1,000 pounds of chlorine and about 105 pounds of water per hour, and the water will be condensed in the condenser 22. The effluent from the tower 12 passes to the tower 28 wherein it is subjected to a pressure of about 40 mm. of mercury absolute. The vapor from this tower escaping through the pipe 30 will carry about 1,000 pounds of chlorine and 1,000 pounds of water per hour. The water will be condensed in the condenser 41. The evactor 36 will require about 2200 pounds per hour of steam.

The vapor from the condenser 41 joins the vapor from the tower 12 in the evactor 16. Hence about 2,000 pounds of chlorine and 210 pounds of water vapor per hour are delivered to the evactor 16 which requires about 2500 pounds of steam per hour. The vapors leaving the condenser 22 will contain about 2,000 pounds of chlorine and 110 pounds of water per hour, and the evactor 46 will require 4,000 pounds of steam per hour to deliver at atmospheric pressure approximately 2,000 pounds of high purity chlorine. In addition to the steam introduced to the evactors, sufficient steam will be supplied to the tower 28 through the pipe 29 to maintain thermal balance in the system. The additions of steam require the purging of the system through the pipe 34 as hereinbefore indicated to avoid excess water in the system.

When it is desired to recover residual chlorine which may escape from the tower 5, I provide a pipe 57 connected to the top of the tower and to an absorber 58, which may be supplied with milk of lime or other absorbing material through a pipe 59 controlled by a valve 60. An agitator 61, driven by a motor 62 or other convenient means, ensures adequate contact of the gas with the absorbent material. The residual chlorine is fixed by combination with calcium and the nitrogen escapes through a pipe 63. The contents of the absorber may be withdrawn from time to time through an outlet 64 provided with a valve 65.

All towers, pumps, pipe lines, etc., not subject to high temperatures may be of rubber-lined construction or of any other material adapted to resist the corrosive effect of chlorine. Packing for the towers may be of ceramic or carbon materials. As already indicated, the evactors may be of similar material. Hence the entire system can be constructed so as to prevent corrosion or deterioration as a result of contact with chlorine. Although I have shown indirect condensers in connection with the evactors, direct coolers may be substituted therefor if desired.

The amount of chlorine vapors leaving tower 5 may be controlled by varying the amount of water entering the tower, by varying the pressures in the towers 12 and 28, or the amount of steam fed to the towers 12 and 28. In this manner the amount of chlorine available for the production of hypochlorite may be adjusted to give the desired ratio between chlorine and hypochlorite as the final products of the operation.

In general the higher the total pressure at which the gases enter the various evactors, the smaller will be the proportion of water present, and the smaller will be the amount of motive steam required in the evactors. Since the use of motive steam for compressing water vapor represents a waste of energy, it is advantageous to operate in a manner that will make the water vapor entering the evactors a minimum.

In case it is desired to convert say one fourth of the available chlorine to hypochlorite, it would nevertheless be advantageous to supply tower 5 with the full amount of water necessary for complete absorption of the chlorine. The final stage of pressure reduction is then maintained at a pressure high enough to allow the water leaving to retain a sufficient amount of chlorine that the vapor pressure of the chlorine therein will be equal to one fourth the partial pressure of chlorine in the gas entering tower 5. In this manner the absorption of more than three fourths of the chlorine in tower 5 is prevented leaving one fourth available for the production of hypochlorite. Since the chlorine recovered as such is then fed to the evactors at the highest possible pressure, the water vapor entering the evactors will be a minimum. A smaller amount of motive steam is then required for the compression of the chlorine itself to atmospheric pressure, and the useless compression of water vapor is reduced to a minimum.

In the event that the partial pressure of chlorine in the inlet gas is so low that the pressure necessary to liberate a substantial proportion of chlorine from the solution approaches the vapor pressure of water at the temperature of the inlet solution, the use of a single stage of evaporation may suffice.

Various changes may be made in the form and arrangement of the apparatus as well as in the details of procedure without departing from the invention or sacrificing the advantages thereof.

I claim:

1. The method of recovering chlorine from a mixture of gases in which chlorine is the major constituent most readily soluble in water, which comprises washing the gas mixture with water to dissolve chlorine therein, subjecting the resulting chlorine solution to successive chlorine vaporization operations at successively reduced pressures below atmospheric pressure, and adding steam to the solution in the final vaporization operation in an amount sufficient to maintain the temperature of the solution during such vaporization operation at substantially the temperature of the solution entering said vaporization operation.

2. The method of recovering chlorine from a mixture of gases in which chlorine is the major constituent, most readily soluble in water, which comprises washing the gas mixture with water to dissolve chlorine therein, subjecting the resulting chlorine solution to a pressure lower than the partial pressure of chlorine in the original gas mixture to vaporize a substantial portion of the chlorine together with some water, subjecting the partially dechlorinated solution to a lower pressure not below the vapor pressure of water at the temperature of the partially dechlorinated solution to vaporize a further portion of the chlorine together with some water, and adding steam to the solution in the final vaporization operation in an amount sufficient to maintain the temperature of the solution during such vaporization operation at substantially the temperature of the solution entering said vaporization operation.

3. The method of recovering chlorine from a mixture of gases in which chlorine is the major constituent most readily soluble in water, which comprises washing the gas mixture with an aqueous medium from the class consisting of water and dilute solutions of chlorine in water to dissolve chlorine therein, subjecting the resulting chlorine solution to a pressure lower than the partial pressure of chlorine in the original gas mixture to vaporize a substantial portion of the chlorine together with some water, subjecting the partially dechlorinated solution to a lower pressure not below the vapor pressure of water at the temperature of the partially dechlorinated solution to vaporize a further portion of the chlorine together with some water, adding steam to the solution in the final vaporization operation in an amount sufficient to maintain the temperature of the solution during such vaporization operation at substantially the temperature of the solution entering said vaporization operation, and utilizing the resulting dechlorinated solution as the aqueous medium to wash the original gas mixture.

4. The method of recovering chlorine from a mixture of gases in which chlorine is the major constituent most readily soluble in water, which comprises washing the gas mixture with water to dissolve chlorine therein, subjecting the resulting chlorine solution to a pressure lower than the partial pressure of chlorine in the original gas mixture to vaporize a substantial portion of the chlorine together with some water, subjecting the partially dechlorinated solution to a lower pressure not below the vapor pressure of water at the temperature of the partially dechlorinated solution to vaporize a further portion of the chlorine together with some water, adding steam to the solution in the final vaporization operation in an amount sufficient to maintain the temperature of the solution during such vaporization operation at substantially the temperature of the solution entering said vaporization operation, and condensing the water vapor admixed with the vaporized chlorine to obtain substantially water-free chlorine.

5. The method of recovering chlorine from a mixture of gases in which chlorine is the major constituent most readily soluble in water, which comprises washing the gas mixture with an aqueous medium from the class consisting of water and dilute solutions of chlorine in water to dissolve chlorine therein, subjecting the resulting chlorine solution to a pressure lower than the partial pressure of chlorine in the original gas mixture to vaporize a substantial portion of the chlorine together with some water, subjecting the partially dechlorinated solution to a lower pressure not below the vapor pressure of water at the temperature of the partially dechlorinated solution to vaporize a further portion of the chlorine together with some water, adding steam to the solution in the final vaporization operation in an amount sufficient to maintain the temperature of the solution during such vaporization operation at substantially the temperature of the solution entering said vaporization operation, utilizing the resulting dechlorinated solution as the aqueous medium to wash the original gas mixture, condensing a portion of the water vapor admixed with the vaporized chlorine from the second vaporization, returning the resulting condensate to the second vaporization, combining the resulting partially water-free chlorine with the vaporized chlorine and water mixture from the first vaporization, condensing the water vapor in such mixture to obtain substantially water-free chlorine, and returning the resulting condensate to the first vaporization.

6. The method of recovering chlorine from a mixture of gases in which chlorine is the major constituent most readily soluble in water, which comprises washing the gas mixture with water to dissolve chlorine therein, subjecting the resulting chlorine solution to a pressure lower than the partial pressure of chlorine in the original gas mixture but higher than the vapor pressure of water at the temperature of such solution to vaporize a substantial portion of the chlorine together with some water, simultaneously supplying heat to the solution in an amount sufficient to prevent a substantial lowering of the temperature thereof, withdrawing the vaporized chlorine and water, and condensing the water vapor and recovering chlorine from the withdrawn vaporized chlorine and water.

7. The method of recovering chlorine from a mixture of gases in which chlorine is the major constituent most readily soluble in water, which comprises washing the gas mixture with water to dissolve chlorine therein, subjecting the resulting chlorine solution to a pressure lower than the partial pressure of chlorine in the original gas mixture but higher than the vapor pressure of water at the temperature of such solution to vaporize a substantial portion of the chlorine together with some water, simultaneously supplying heat to the solution in an amount sufficient to prevent a substantial lowering of the temperature thereof, withdrawing the vaporized chlorine and water, condensing the water vapor and recovering chlorine from the withdrawn vaporized chlorine and water, and returning the condensed water vapor to be utilized in the subsequent washing of further amounts of the gas mixture.

8. The method of recovering chlorine from a mixture of gases in which chlorine is the major constituent most readily soluble in water, which comprises washing the gas mixture with an aqueous medium from the class consisting of water and dilute solutions of chlorine in water under such conditions as to dissolve only a portion of the chlorine therein, withdrawing an effluent gas mixture containing the undissolved chlorine, subjecting the resulting chlorine solution to successive chlorine vaporization operations at successively reduced pressures below atmospheric pressure, adding steam to the solution in the final vaporization operation in an amount sufficient to maintain the temperature of the solution during such vaporization operation at substantially the temperature of the solution entering said vaporization operation, the final vaporization operation being conducted under a pressure sufficiently high that the aqueous medium leaving said operation will contain a relatively small amount of chlorine compared to the amount of chlorine contained in the aqueous medium resulting from said washing operation, returning the aqueous medium leaving said final vaporization operation to the washing operation and there using it as the aqueous medium to wash further amounts of the original gas mixture, and reacting the undissolved chlorine in the withdrawn effluent gas mixture with a material capable of forming a hypochlorite.

FREDERICK R. BALCAR.

REFERENCES CITED

The following references are of record in the file of this patent:

UNITED STATES PATENTS

| Number | Name | Date |
|---|---|---|
| 1,418,002 | Kothny | May 30, 1922 |
| 1,422,183 | Curme | July 11, 1922 |
| 1,809,441 | Elliott | June 9, 1931 |
| 2,061,332 | Rué | Nov. 17, 1936 |
| 2,144,692 | Schuftan | Jan. 24, 1939 |
| 2,169,210 | Balcar | Aug. 15, 1939 |
| 2,206,490 | Tramm | July 2, 1940 |
| 2,242,323 | Powell | May 20, 1941 |
| 2,250,925 | Bohcock | July 29, 1941 |
| 2,320,635 | Mericola | June 1, 1943 |

FOREIGN PATENTS

| Number | Country | Date |
|---|---|---|
| 15,488 | Great Britain | 1886 |